US006868572B1

(12) United States Patent
Newton

(10) Patent No.: US 6,868,572 B1
(45) Date of Patent: Mar. 22, 2005

(54) SCREWDRIVING AND COUNTERSINKING BIT

(75) Inventor: John Edgley Newton, Harbord (AU)

(73) Assignee: Savetime Products Pty. Ltd., Anguilla (KN)

( * ) Notice: Subject to any disclaimer, the term of this patent is extended or adjusted under 35 U.S.C. 154(b) by 0 days.

(21) Appl. No.: 10/130,987

(22) PCT Filed: Nov. 28, 2000

(86) PCT No.: PCT/AU00/01468

§ 371 (c)(1),
(2), (4) Date: Aug. 12, 2002

(87) PCT Pub. No.: WO01/39915

PCT Pub. Date: Jun. 7, 2001

(30) Foreign Application Priority Data

Nov. 29, 1999  (AU) .............................................. PQ4328

(51) Int. Cl.[7] .............................................. B25D 15/00
(52) U.S. Cl. ................................ 7/165; 81/460; 76/82; 408/22; 408/200
(58) Field of Search ......................... 7/165; 76/82, 115, 76/119; 81/460; 408/22, 24, 25, 200

(56) References Cited

U.S. PATENT DOCUMENTS

| D170,119 S | * | 8/1953 | Hull .............................. D8/87 |
| 3,186,009 A | * | 6/1965 | Simmons ....................... 7/168 |
| 3,207,196 A | * | 9/1965 | Stillwagon, Jr. ............. 408/229 |
| 4,325,153 A | * | 4/1982 | Finnegan ........................ 7/165 |
| 4,514,117 A | * | 4/1985 | Scott ....................... 408/239 R |
| 4,852,196 A | * | 8/1989 | Martin ............................ 7/165 |
| D333,964 S | * | 3/1993 | Alexander ..................... D8/82 |

FOREIGN PATENT DOCUMENTS

| AU | 37729/95 | 1/1996 |
| DE | 4402619 A1 | 8/1995 |
| DE | 3038465 A1 | 4/1998 |
| FR | 2427160 | 2/1980 |
| WO | WO98/01252 | 1/1998 |
| WO | WO99/17908 A1 | 4/1999 |

OTHER PUBLICATIONS

English translation of French Patent Document 2,427,160.*

* cited by examiner

Primary Examiner—M. Rachuba
(74) Attorney, Agent, or Firm—Whitham, Curtis & Christofferson, P.C.

(57) ABSTRACT

The invention provides a bit (10) for use with a rotatable tool, said bit including: a shaft (12) having a rearward end adapted to be held by a chuck of the rotatable tool, and a forward end (18) having cutting tips formed thereon; a reaming head (14) including a body having a bore (16) adapted to receive the shaft therethrough in a sliding fit, the body having a plurality of cutting blades (26) formed on at least one peripheral surface thereof; the bore and/or the shaft having formations thereon such that when the rearing head has the shaft operatively located in the bore the reaming head is rotationally locked into the shaft; the reaming head and the shaft being separable from each other to allow either component to be replaced independently of the other. The invention also provides a bit having a tip end and shank end for use with a rotatable tool, said bit having at least 4 blades (24) to engage ard drive a screw when said rotatable tool is rotated, each blade including at said tip end a bevel so as to form a cutter (22) at the extremity of said blade, each bevel and/or cutter being able to cut in the same rotational direction. The invention further provides a method of making a bit for use as a screwdriver and countersinker, said method including the steps of: 1) forming at least a four blade screw driving end onto one end of blank, 2) forming a bevel at the extremity of each blade, said bevel producing an inclined plane cutter.

31 Claims, 16 Drawing Sheets

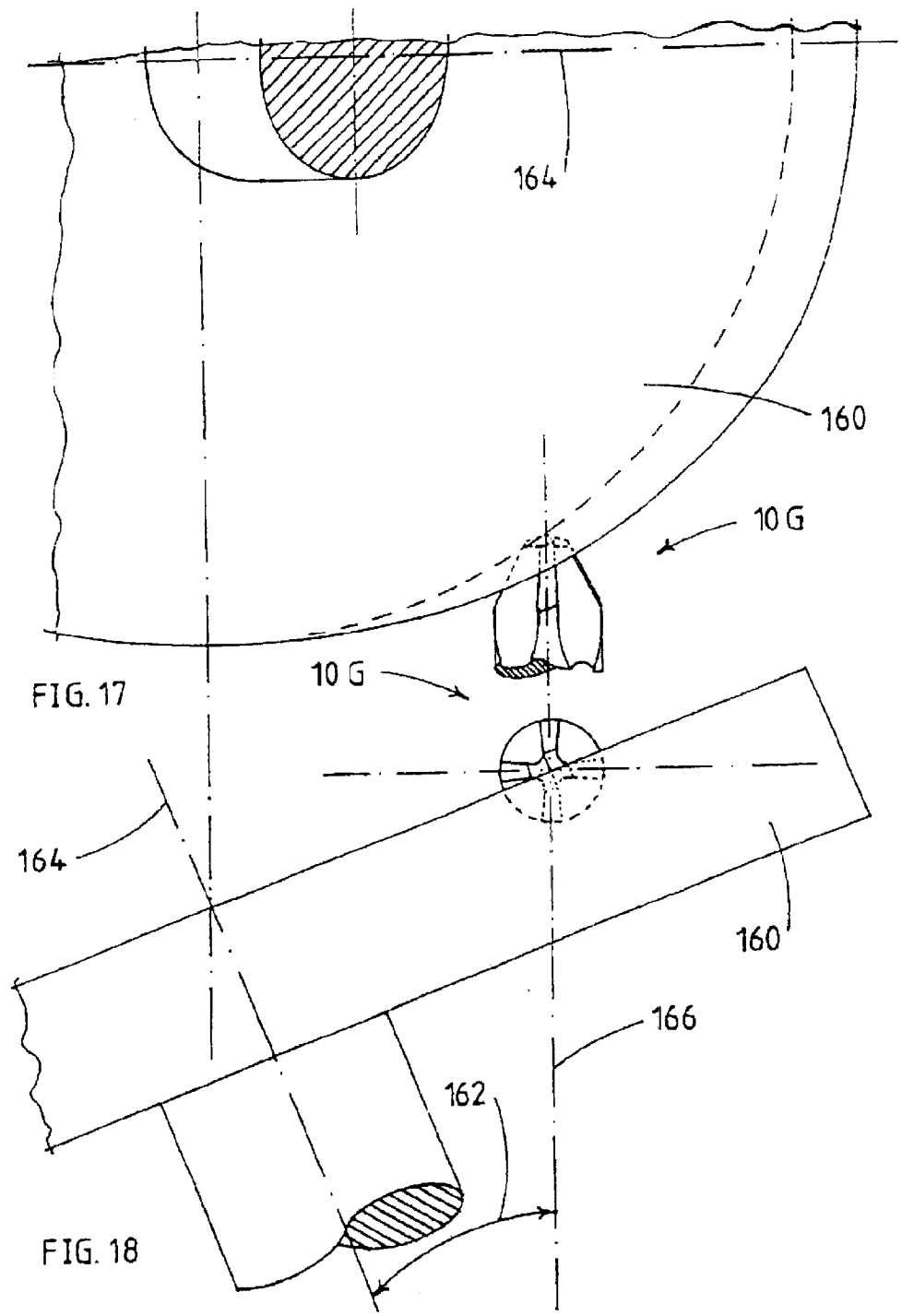

SCREWDRIVING AND COUNTERSINKING BIT

FIELD OF THE INVENTION

This invention relates to a screw driving and countersinking bit of the type which can be used by rotatable power tools for not only starting and countersinking a hole in a surface which is to have a screw fastener inserted therein, but also which can be used to drive the screw into the surface.

BACKGROUND OF THE INVENTION

The applicant's prior filed international application PCT/AU98/00834 describes in detail the problems associated with firstly starting a screw hole through a hard surface with a drilling tool, and then driving a screw which is inserted into the start hole, with a screw driver. Generally two different tools are required for the two different operations and this significantly increases the time required to insert the screw into the surface.

Modern electric power tools can be rotated at speeds which vary between very low speeds, as may be used to drive a screw, and very high speeds which are used for drilling holes and surfaces.

SUMMARY OF THE INVENTION

The present invention provides a bit for use with a rotatable tool, said bit including:

a shaft having a rearward end adapted to be held by a chuck of the rotatable tool, and a forward end having cutting tips formed thereon;

a reaming head including a body having a bore adapted to receive the shaft therethrough in a sliding fit, the body having a plurality of cutting blades formed on at least one peripheral surface thereof;

the bore and/or the shaft having formations thereon such that when the reaming head has the shaft operatively located in the bore the reaming head is rotationally locked to the shaft;

the reaming head and the shaft being separable from each other to allow either component to be replaced independently of the other.

Preferably the forward end of the shaft includes four blades orthogonally aligned or angularly equi-spaced, relative to each other such that said forward end is specifically adapted to be used as a Phillips head screw driver, or similar type screw drivers.

The reaming head preferably has a forward face of generally tapered or cone shaped configuration, tapering convergently towards the bore through the body, said forward face having cutting blades formed thereon.

The shaft can have a square, hexagonal, or other polygonal cross sectional shape with the bore being of corresponding shape, at least in part, to provide for the aforementioned rotational lock. The shaft can also have a taper alone its length with the bore having a corresponding taper to provide for the reaming head to be taper locked to the shaft.

The bit can further include a spacer located on the shaft rearward of the reaming head to space the reaming head away from the chuck in use. The shaft can have a shoulder thereon against which the reaming head can bear in use.

The cutting tip on the forward end of the shaft can be of a form described in application number PCT/AU98100834, or can be defined by the forward end of the orthogonally aligned, or angularly equi-spaced, blades which define the Phillips screw driver head.

The present invention also provides a bit having a tip end and shank end for use with a rotatable tool, said bit having at least 4 blades to engage and drive a screw when said rotatable tool is rotated, each blade including at said tip end a bevel so as to form a cutter at the extremity of said blade, each bevel and or cutter being able to cut in the same rotational direction.

The bevel can be formed so as to be confined to each blade. Alternatively the bevel can be formed so that while being applied to one blade, the bevel is also formed on an adjacent blade.

The cutter preferably has a leading portion which is an edge. The cutter can also include in its lead portion a wedge shaped formation. The wedge shaped position being formed on one side by a side of said blade and on another side by the cut of the bevel formed on an adjacent blade.

A method of making a bit for use as a screw driver and countersinker, said method including the steps of:

1. forming at least a four blade screw driving end onto one end of blank
2. forming a bevel at the extremity of each blade, said bevel producing an inclined plane cutter.

Step 2 can be performed simultaneously on two or more blades, or can be performed on one blade at a time.

The bevel can be formed so as to be present only on each blade extremity. Alternatively the bevel, whilst being formed on a first blade can cut into a second blade, thereby dressing the inclined plane cutter of said second blade before or after said bevel is formed in said second blade.

Preferably an under cut is formed by said bevel cutting into said second blade.

Alternatively the cut produces as surface which has its direction normal to the axis of rotation or an axis parallel to the axis of rotation of said bit.

Preferably said cut and a side of said blade on which said cut is located form on the lead portion of each blade a wedge shaped portion.

Preferably the rest of said blade away from said bevel includes another cutting edge extending from the tip end towards the shank end.

Preferably the bevel is formed by a grinding wheel.

The grinding wheel can have its axis of rotation parallel to the axis of said blade when said tip is viewed in plan view.

To form said cut in said second blade said axis of rotation of said grinding wheel is at an acute angle to the axis of said blade when viewed in plan view.

Preferably said bit is indexed 90° for said grinding wheel to form said bevel on each blade.

These and further features of the invention will be made apparent from the description of various embodiments of the invention given below by way of example. In the description, reference is made to the accompanying drawings, but this was a feature shown in the drawing should not be constituted as limiting on the invention.

BRIEF DESCRIPTION OF THE DRAWINGS

FIG. 17 illustrates a front elevation of a manufacturing method of the bits of FIGS. 13 to 16;

FIG. 18 illustrates a plan view of the manufacturing method of FIG. 17;

DETAILED DESCRIPTION OF PREFERRED EMBODIMENTS

Figure 1:
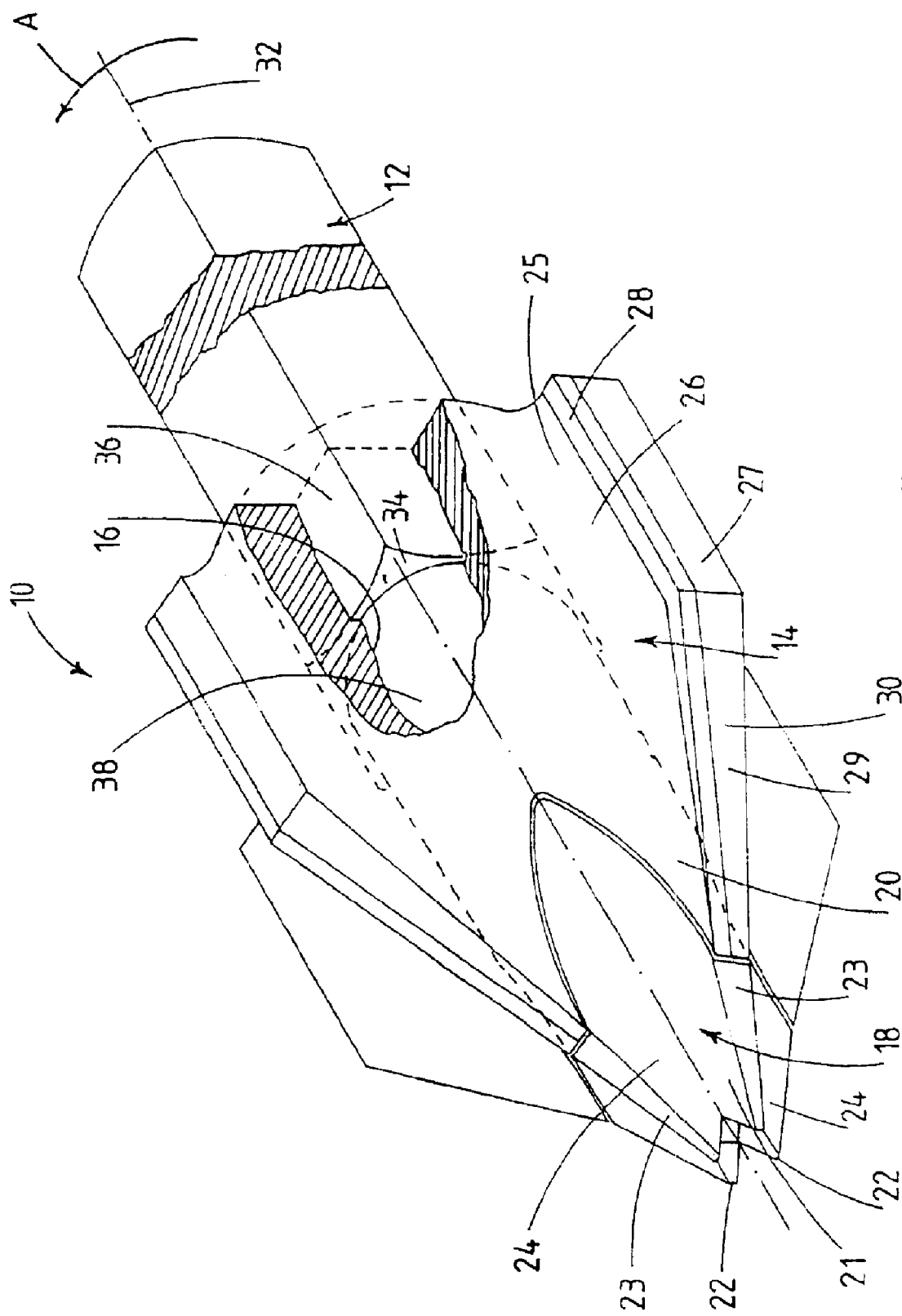
FIG. 1 shows a perspective, part cutaway, view of a drilling bit according to the invention.
Figure 9:
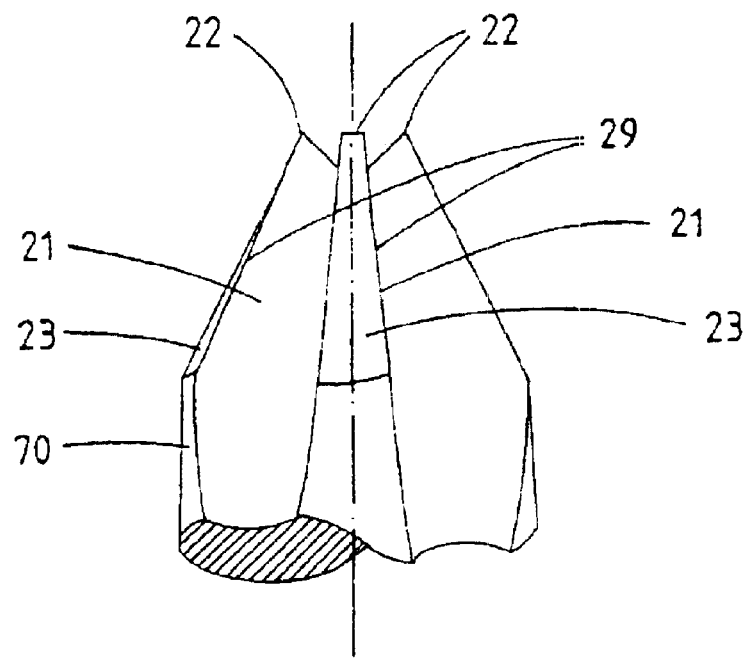
FIGS. 9 and 10 show side and plan views respectively of the forward part of a drill shaft similar to that show in FIG. 1.
Figure 10:
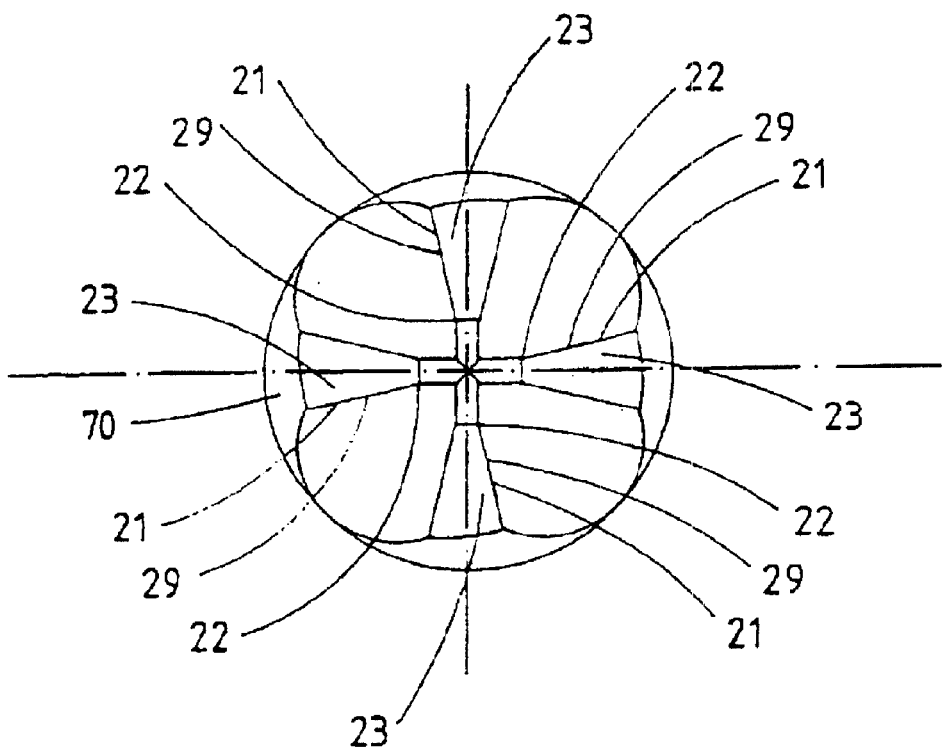

Illustrated in FIGS. 1, 9 and 10 a bit 10 has two main components, namely a shaft 12 and a reaming head 14. The reaming head 14 is of larger diameter than the shaft 12 and the reaming head 14 has a bore 16 therethrough, through which the shaft 12 is inserted. The forward end 18 of the shaft 12 projects through and beyond the forward end 20 of the reaming head 14 so that the forward end 18 of the shaft 12 is the leading part of the bit 10.

The forward-end of the shaft 12 has cutting tips 22 formed thereon which will cut into a surface against which the shaft 12 is pushed in use. There are four cutting tips 22, each located at on the forward end of a blade 24, the four blades being orthogonally aligned, or angularly equi-spaced, relative to each other so that the blades 24 for a screw driver of the Phillips head screw driver type, to drive in or remove Phillips head screws from a surface. Other similar screw driver configurations, such as a "Pozidrive", could be used with the bit of the invention.

The blades 24 are arranged in a cone shaped configuration, that is, they taper convergently towards the forward end of the shaft 12. The reaming head 14 also has four blades 26, each blade 26 having a cutting edge 28 on the leading edge thereof. The cutting edges 28 are formed by the lateral surfaces 27 and 29 being ground or cut so as to be at an angle of less than 90° and preferably approximately 85° to the side face 25 of the blade 26. The cutting edges on the blades 24 are formed in a similar manner in that the lateral surfaces 23 on the blades 24 at an angle of less than 90§ and preferably approximately 85§ to the sides 21 of the blades 24. When the bit 10 is rotated in the direction of a arrow "A" the cutting edges 28 provide a cutting edge for the blades 26. The blades 24 on the shaft 12 include cutting edges 22 on the leading edges thereof.

The forward end 30 of the reaming head 14 is of tapered or cone shaped configuration with a forward end of each of the blades 26 being angled at a steeper angle relative to the shaft axis 32 than the corresponding taper angle of the blades 24. The reaming head 14 can be used either to form a counter sunk hole for the head of a screw to be inserted into a surface, or, alternatively, the reaming head can be used to cut a relatively deep hole in a surface into which a screw can be inserted, and thereby creating a hole which will be able to receive a plug.

The reaming head 14 is slideable relative to the shaft 12 so that, when required, the reaming head can be removed from the shaft 12. The reaming head 14 can be formed of a material which is different to from the material from which the shaft 12 is formed. The materials from which the respective components are formed will be selected so as to optimise the cost and wear characteristics of the components. Thus, for example, should the shaft 12 be formed of a relatively inexpensive material compared to that of the reaming head, then the shaft 12 can be replaced on a more frequent basis than that of the reaming head 14. This will allow the reaming head 14 to be retained and reused when the shaft 12 requires replacement. Alternatively, for certain applications, the shaft 12 can be formed of a hard wearing and expensive material and therefore be more costly than the reaming head 14. In such instances it might be that reaming head 14 requires replacement more frequently than the shaft 12.

To allow for the independent replaceability of the shaft 12 and reaming head 14, it is desirable that the reaming head 14 is a sliding fit on the shaft 12. A locking arrangement is required between the shaft 12 and the bore 16 through the reaming head 14 to prevent relative rotation therebetween. In the preferred arrangement, the bore 16, at least for a portion of its length, has a non-circular configuration, typically hexagonal or square. The shaft 12 will have a corresponding configuration so that when the reaming head 14 is located operatively on the shaft 12, the two components will fit together and not be able to rotate relative to each other. Furthermore, the shaft 12 will preferably have a stepped configuration defining a shoulder 34, as indicated in FIG. 1.

As an alternative the forward pan of the shaft 12 can be tapered to provide a friction or taper lock between the shaft 12 and reaming head 14. This is described in more detail below. As shown in FIG. 1, the rearward part 36 of the shaft is of hexagonal configuration and is located in a hexagonal portion of bore 16, whereas the forward part 38 of the shaft is round and is located in a round portion of the bore 16.

Figure 2:
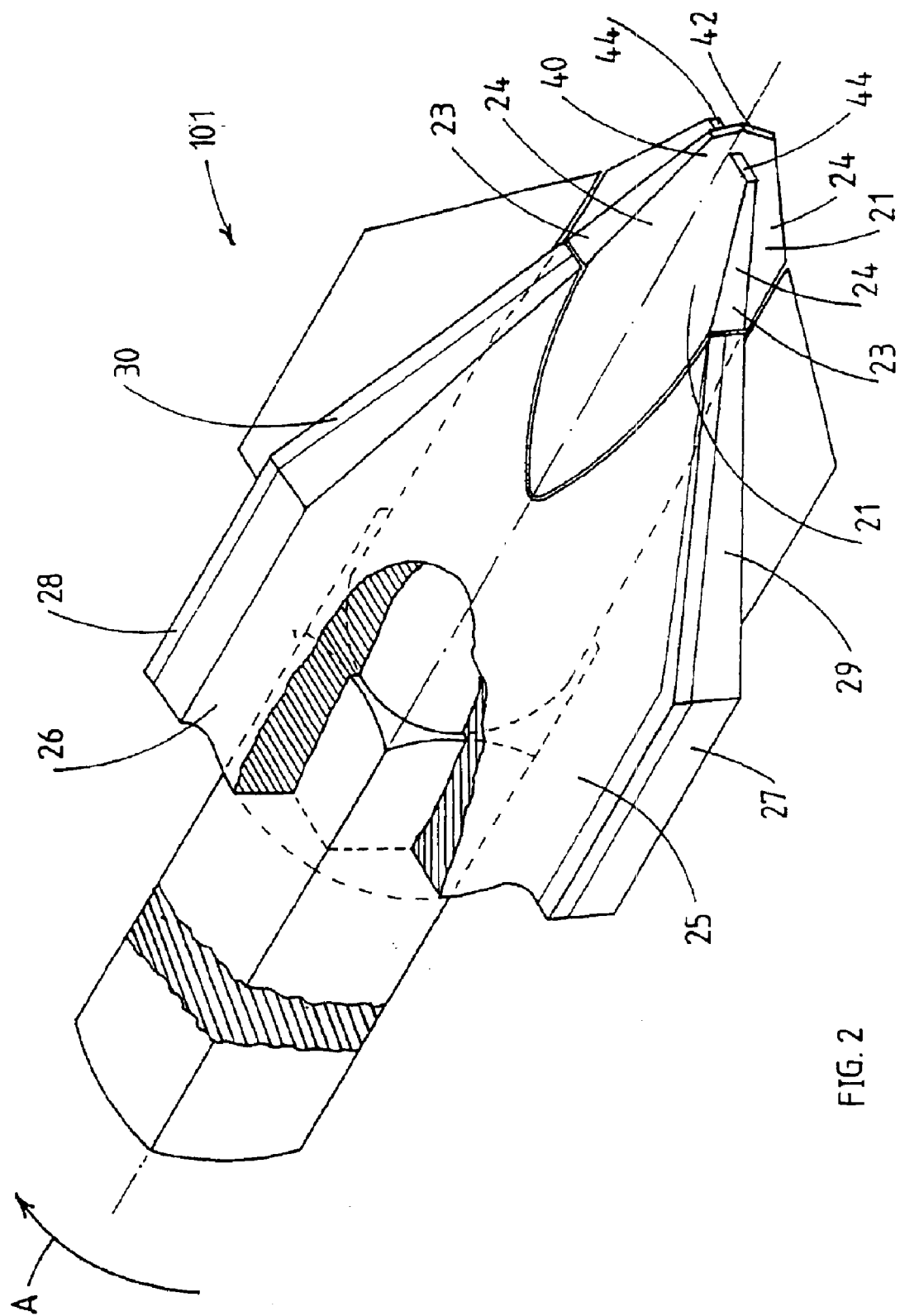
FIG. 2 shows a similar view to that of FIG. 1 of a second embodiment of drilling bit according to the invention.
Figure 7:
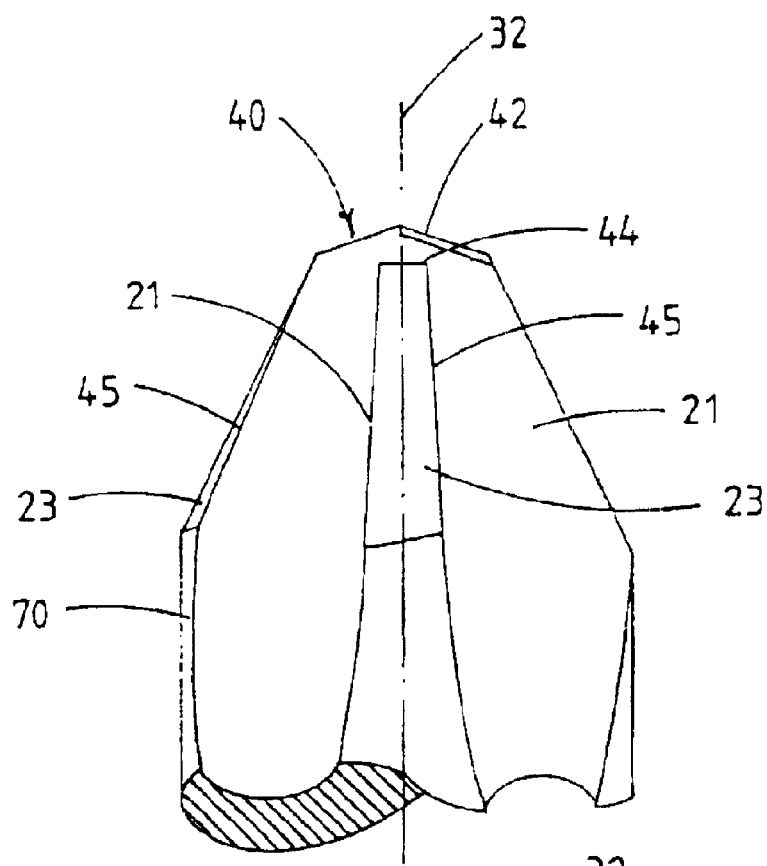
FIGS. 7 and 8 show side and plan view respectively of the forward part of a drill shaft similar to that shown in FIG. 2.
Figure 8:
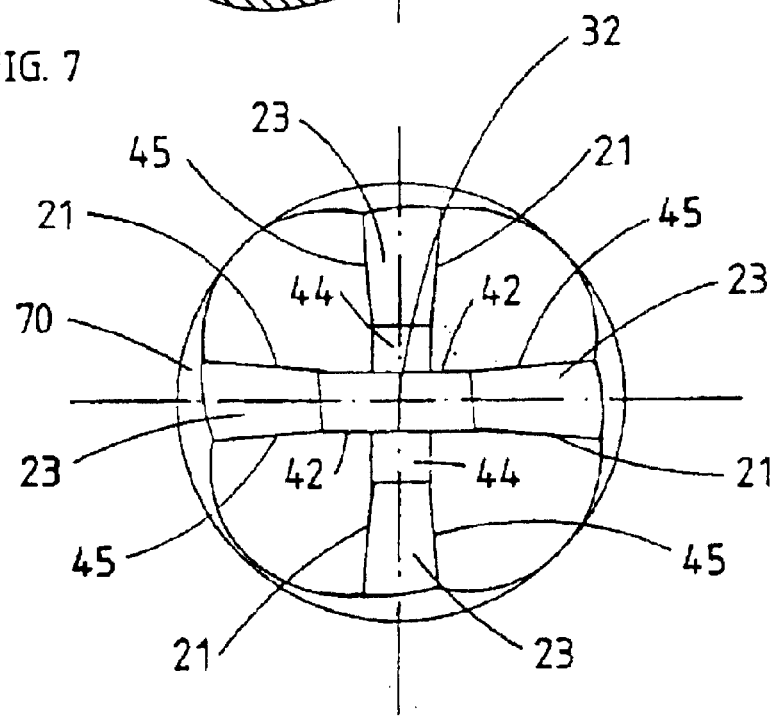

Turning now to FIGS. 2, 7 and 8 of the drawings, a bit 10' similar to that of the previous embodiment is shown except that the cutting tips 40 on the forward end of the shaft are more in the form of a typical blade. As shown, two of the blades 24 which are opposite each other on the tip together define a v-shape starting cutting tip 42 which is adapted to form starter hole in a surface to which a screw is to be inserted. The other two blades 24 have ends 44 which are set back from the starting cutting tip 42. Plus, the starting cutting tip 42 will provide the initial cut when in use. The four blades 24 can be used in a manner of a Phillips screw driver to drive in a Phillips headed screw.

It will be noted that the cutting edges 28 in the embodiment shown in FIG. 2 are located on the opposite sides of the blades 26 since the bit shown in FIG. 2 is adapted to be rotated in the opposite direction to that of the previous embodiment to achieve a countersunk hole or depression. The cutting edges 28, and edges on blades 24 are formed in a similar manner to the edges of the previous embodiment.

Figure 3:
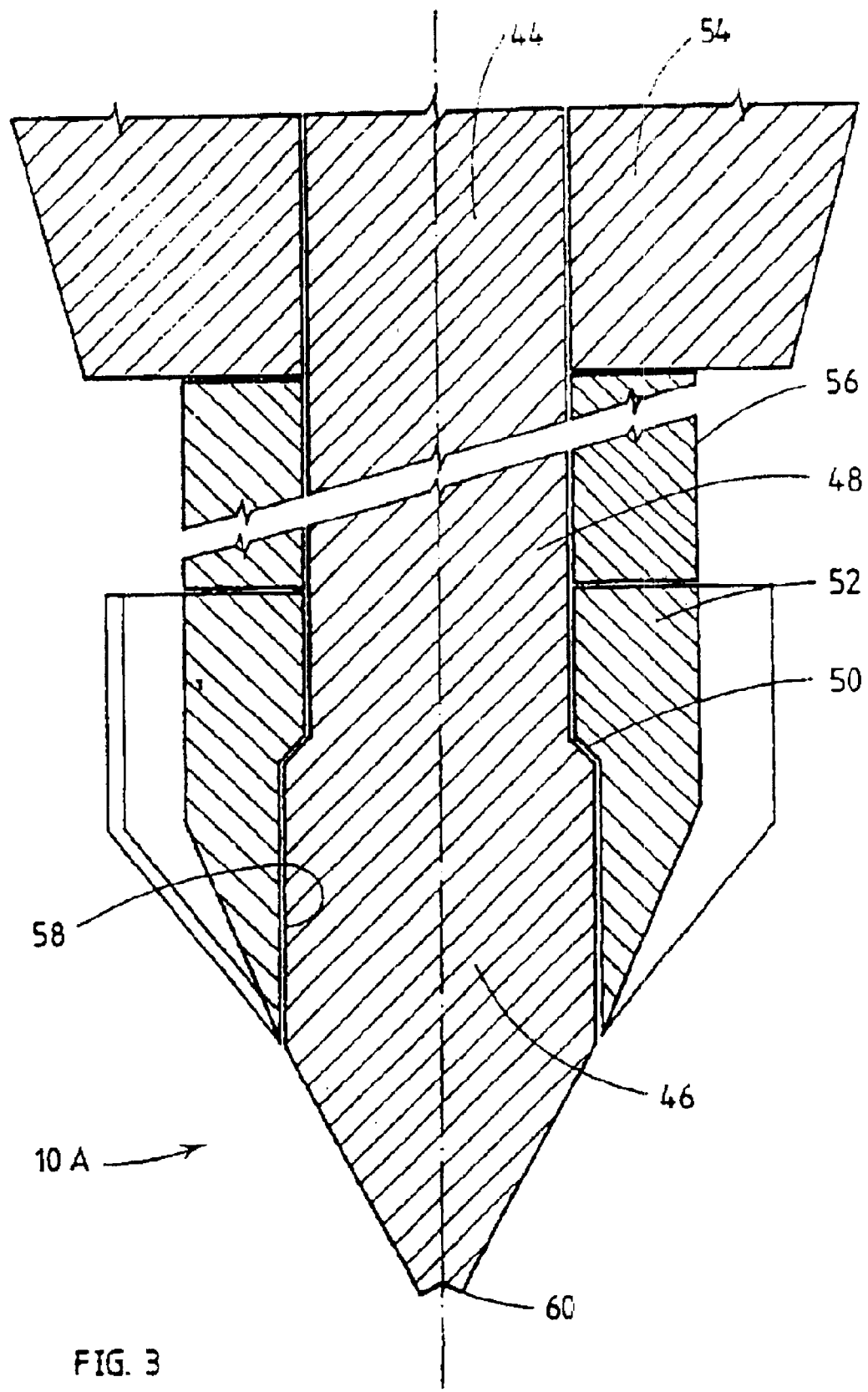
FIG. 3 shows a cross sectional side view of a drilling bit according to the invention mounted in a drill chuck.

In FIG. 3, a slightly different arrangement of bit 10A is shown. In this bit 10A, the shaft 44 has a forward end 46 of rounded larger diameter than the rearward end 48 thereof. A rearward facing shoulder 50 provides a surface against which the reaming head 52 will bear when the bit 10A is operatively installed in a drill chuck 54. A cylindrical spacer 56 butts up against the forward end of the drill or chuck 54 and the rearward end of the reaming head 52 to ensure that the reaming head 52 does not slide rearwardly under pressure as the bit 10A is used. Thus, the bit 10A shown in FIG. 3 is assembled by inserting the rearward end of the shaft 44 through the bore 58 in the reaming head 52. The shaft 44 has, on its forward end, cutting tips 60 of a type similar to that depicted in FIG. 1 of the drawings. It is envisaged that the forward part 46 of the shaft 44 will be round in cross section where as the rearward part 48 will be square or hexagonal and, likewise, the forward part of the bore 58 will be circular in cross section whereas the rearward part of the bore 58 will be square or hexagonal to provide rotational lock between the shaft and the reaming head.

Figure 4:
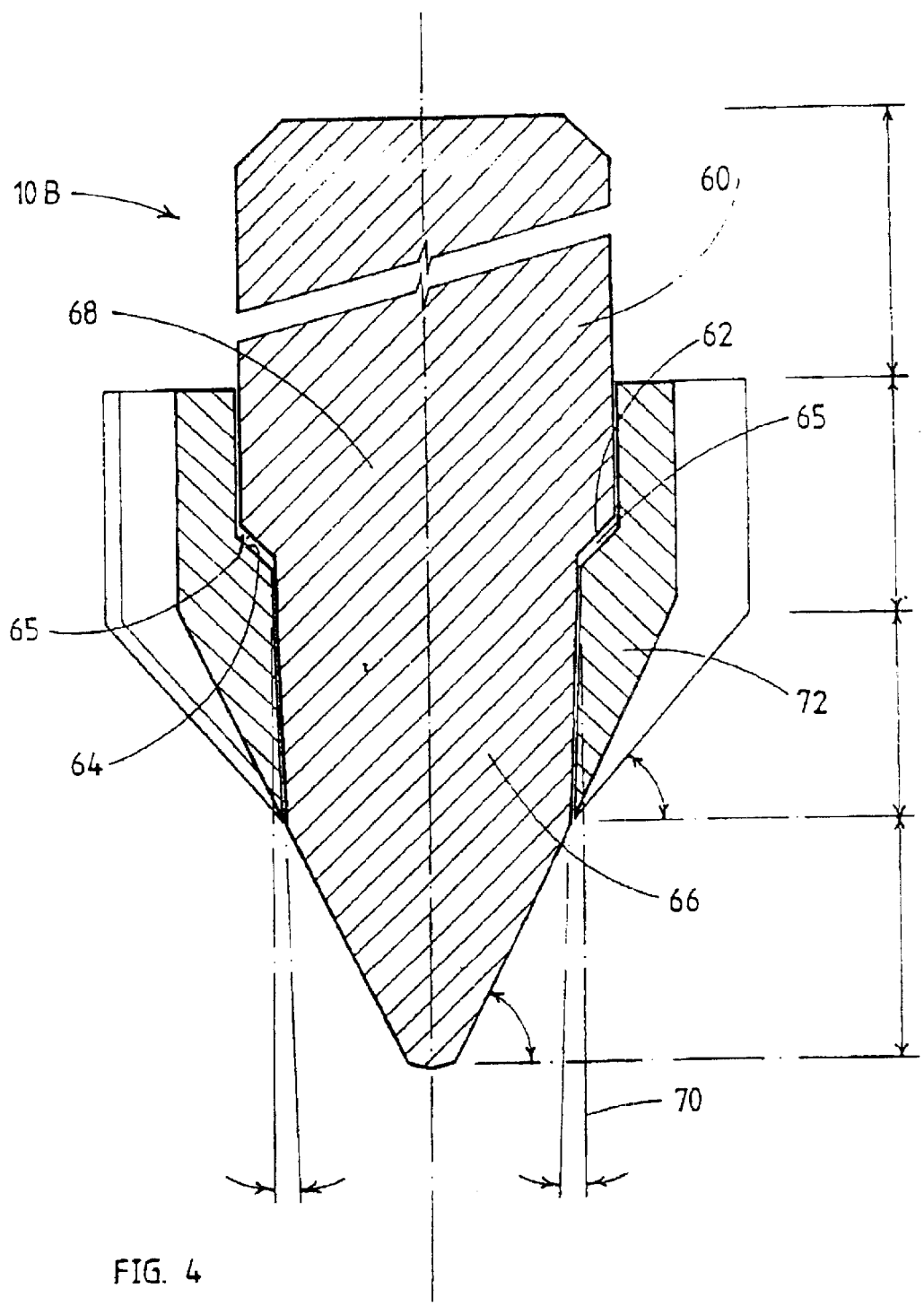
FIG. 4 shows a cross sectional side view of another embodiment of drilling bit according to the invention.

In FIG. 4 of the drawings, a bit 10B is shown. In this bit 10B the shaft 60 provides a shoulder 62 which faces forwardly whereas the bore has a rearwardly facing internal shoulder 64 against which in the assembled arrangement is spaced from the shoulder 62. The forward part 66 of the shaft 60 is of circular configuration whereas the rearward part 68 of the shaft 60 is of non-circular configuration. The forward part 66 of the shaft 60 is preferably of tapered configuration, the angle of taper being indicated by angle 70. The reaming head 72 has the same taper, which is such that when the tapered bore of the reaming head 72 is inserted onto the shaft 60, the reaming head 72 will lock onto the tapered shaft of the forward part 66 thereby ensuring that the two components are locked together in use. A gap 65 is defined between the shoulders 62 and 64 which allows the reaming head 72 and shaft 60 to lock together in use by permitting the engagement of shoulders 62 and 64 prior to the tapers on the shaft 60 and bore in reaming head 72 taper locking.

To remove the reaming head 72 from the shaft 60 the reaming head 72 will need to be tapped off the shaft 60 to break the taper lock between the shaft 60 and the reaming head 72. However, with the stepped shaft A arrangement shown in FIG. 4, it will be appreciated that pressure applied to the reaming head 72 during normal drilling operation will simply urge the reaming head 72 against the taper 70 and no inadvertent dislodgment of the reaming head 72 or the shaft 60 will thus take place.

Figure 5:
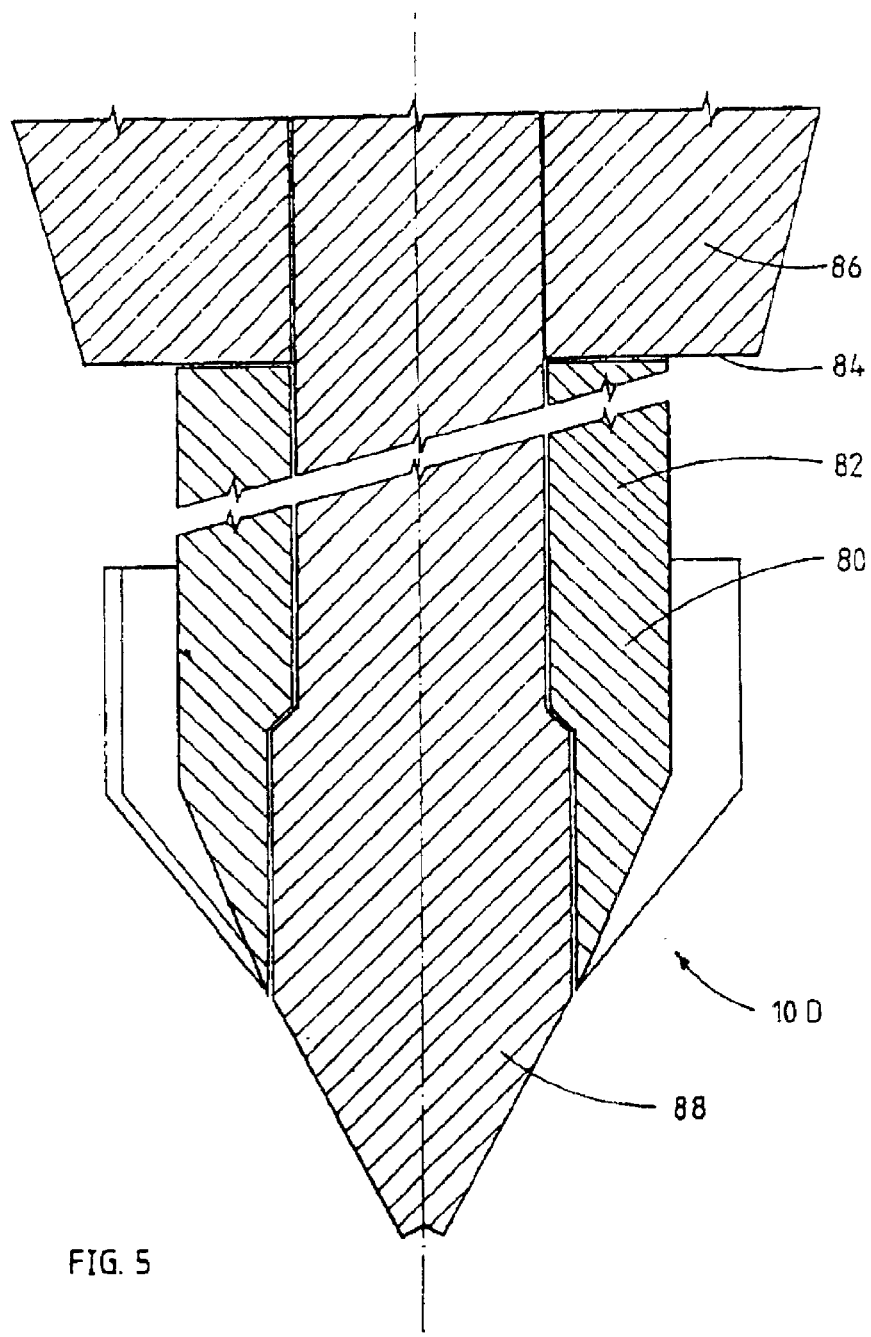
FIG. 5 shows a cross sectional side view of a further embodiment drill bit according to the invention.

In the bit 10D shown in FIG. 5, the reaming head 80 has a cylindrical rearwardly extending extension 82 which is adapted to abut the forward face 84 of a drill chuck 86. Thus, the cylindrical extension 82 will prevent the reaming head 80 becoming dislodged from the shaft 88 during use.

Figure 6:
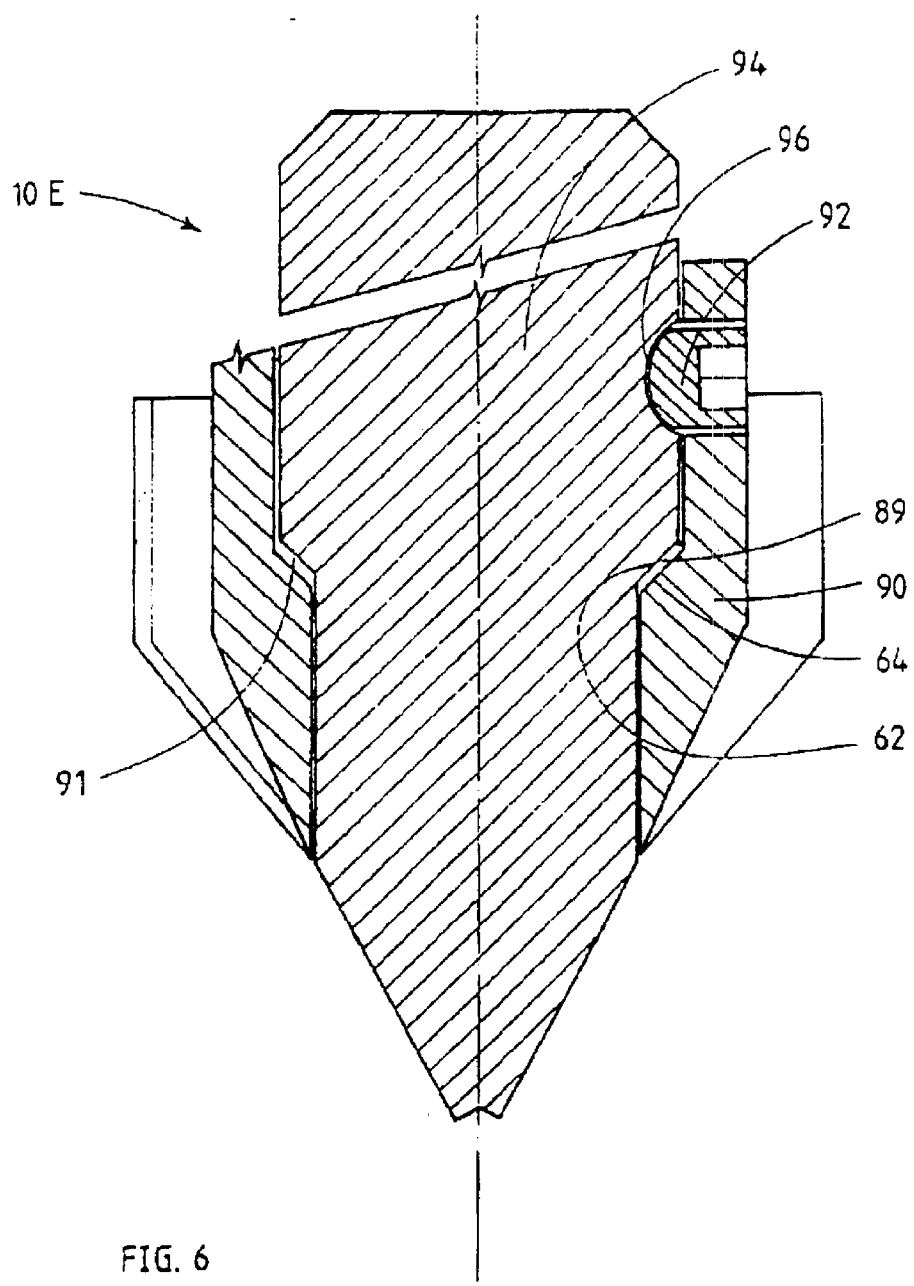
FIG. 6 shows a cross sectional side view of a further embodiment of drilling bit according to the invention.

In the bit 10E shown in FIG. 6, the reaming head 90 has a grub screw 92 for locking the reaming head to the shaft 94. It will be noted that the shaft 94 has a recess 96 into which the grub screw 92 locates to positively lock the reaming head 90 to the shaft 94. To remove the reaming head 90 from the shaft 94 the grub screw 92 can be disengaged from the recess 96, thereafter allowing the reaming head to be slid forward off the forward end of the shaft 94 and thereby allowing either the reaming head or the shaft to be replaced independently of the other. It is envisaged that with the arrangement shown in FIG. 6, it is not necessary for the shaft 94 and the internal bore through the reaming head 90 to be of non-circular configuration. However, a non-circular arrangement is still the preferred arrangement. In FIG. 6 is illustrated a gap 89. This gap 89 can be replaced by the shoulders 62 and 64 being in abutment if desired.

Figure 11:
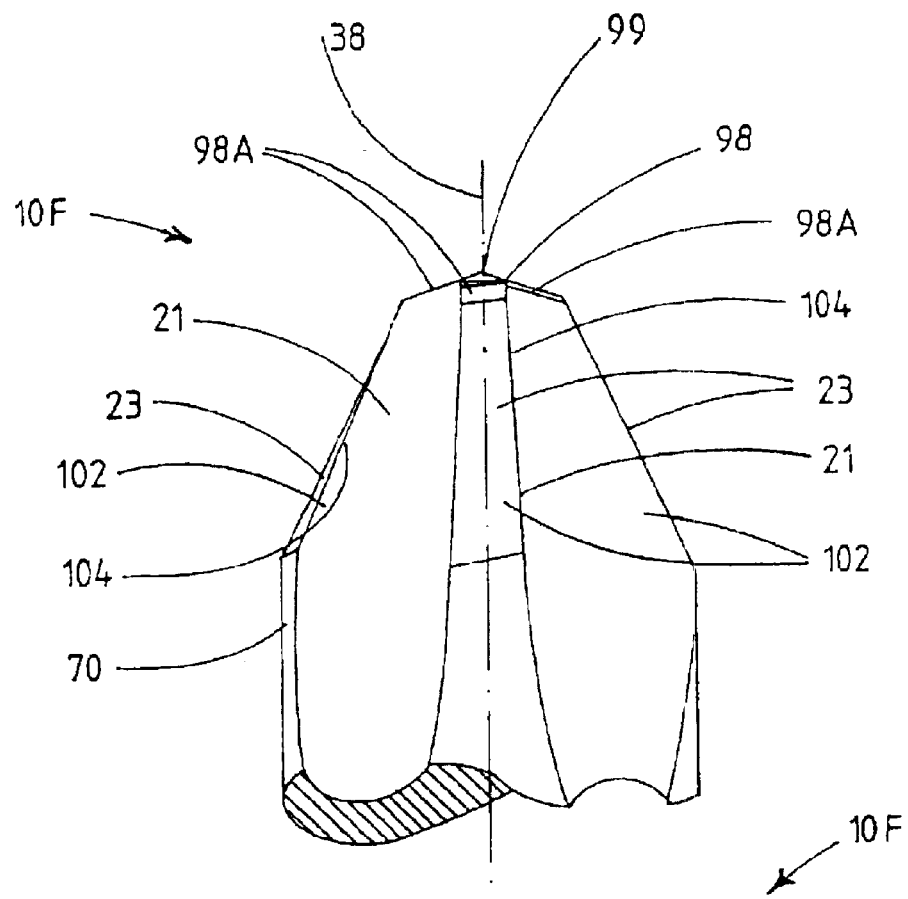
FIGS. 11 and 12 show side and plan views respectively of a forward part of a further embodiment of drill shaft suitable for use with the invention.
Figure 12:
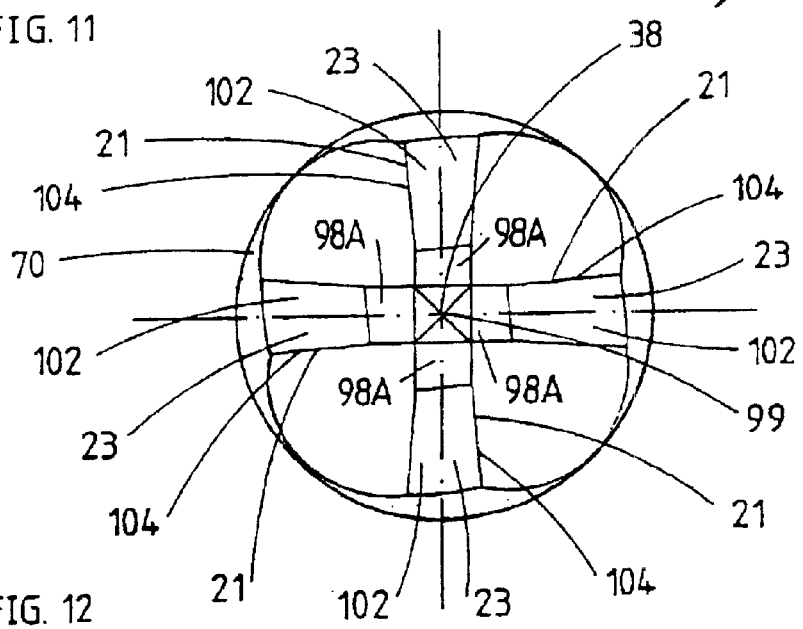
Figure 22:
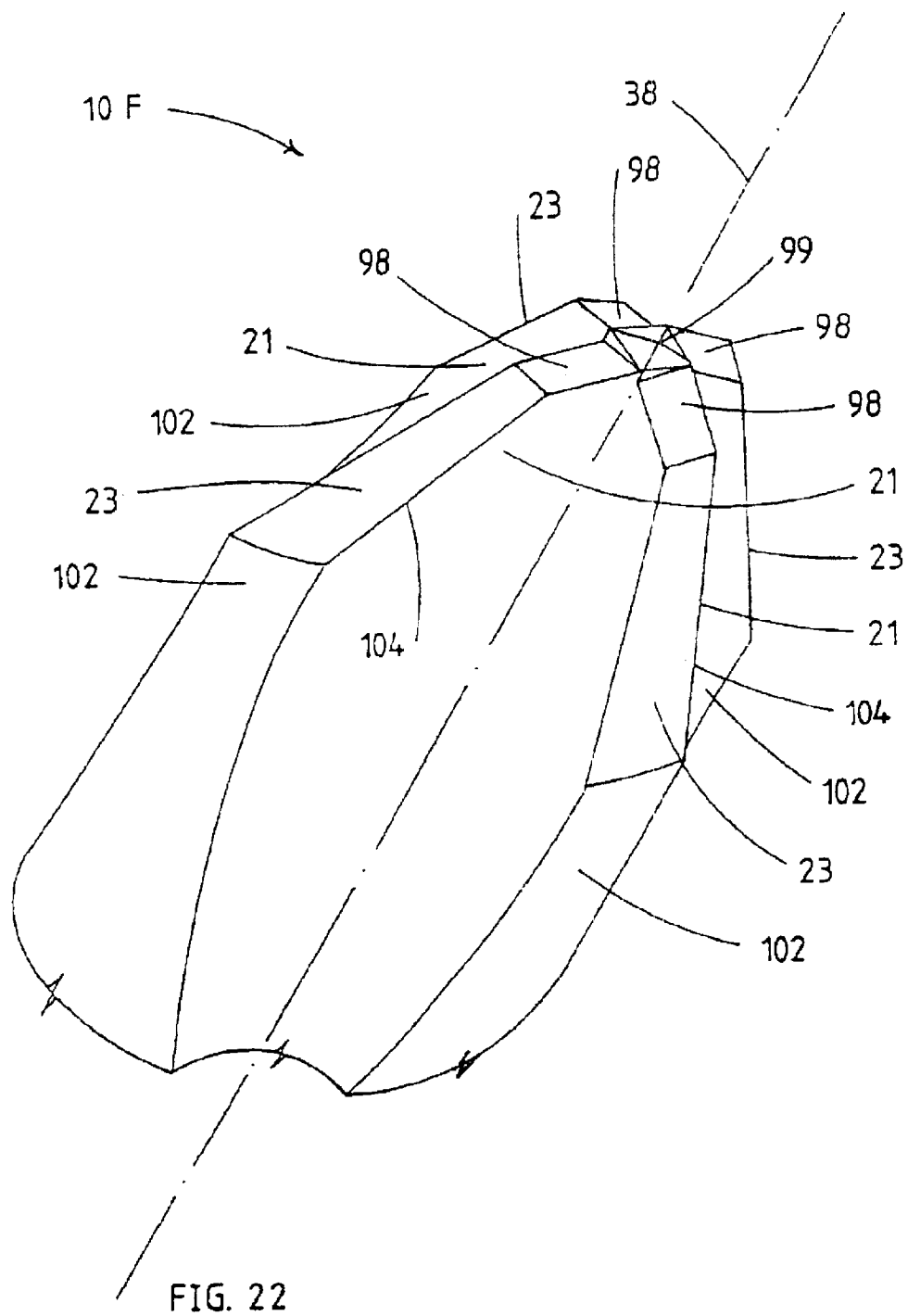
FIG. 22 illustrates a perspective view of the bit of FIGS. 11 and 12.

The bit 10F shown in FIGS. 11, 12, and 22 is similar to the previous embodiments and like parts have been like numbered. The difference between the bit 10F and previous embodiments is that the cutting tip 98 is of bevelled configuration as shown leading to a point 99 on the axis 38 of the shaft. The forward part of the shaft is defined by four orthogonal blades 102, each having a cutting edge 104 (formed in a similar manner to the previous embodiments) on the leading edge thereof. The shaft is tapered along its length as indicated at numeral 70 to provide the taper lock with the reaming head in the manner described above. The point 99 is present on a square pyramid. It will be noted that the planes of the bevelled portions 98A which form the cutting tip 98 do not include the point 99.

Figure 13:
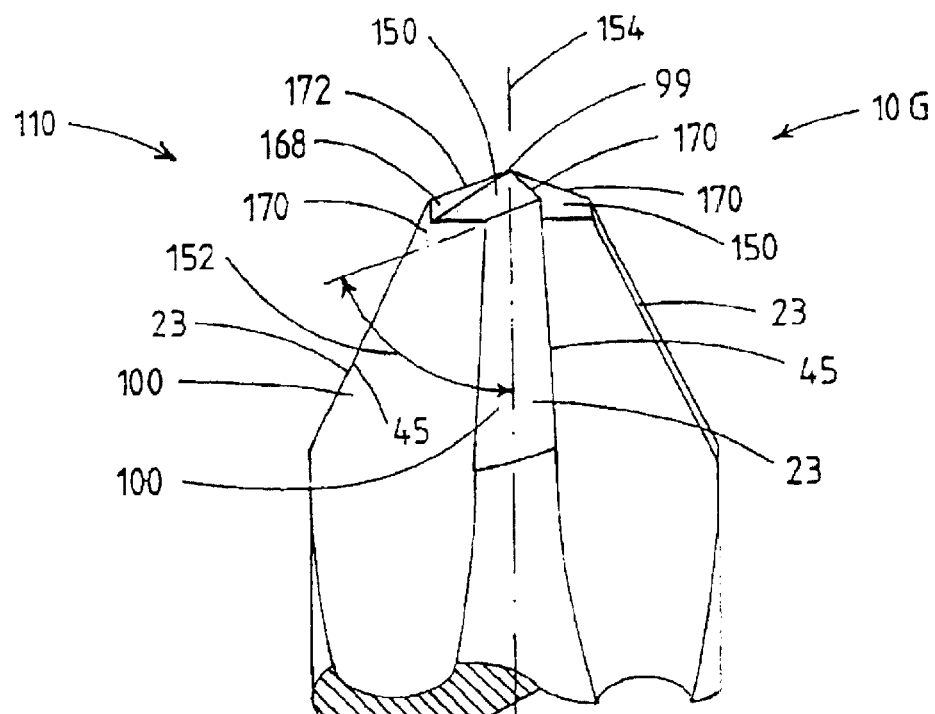
FIG. 13 illustrates a front elevation of another Phillips head bit.
Figure 14:
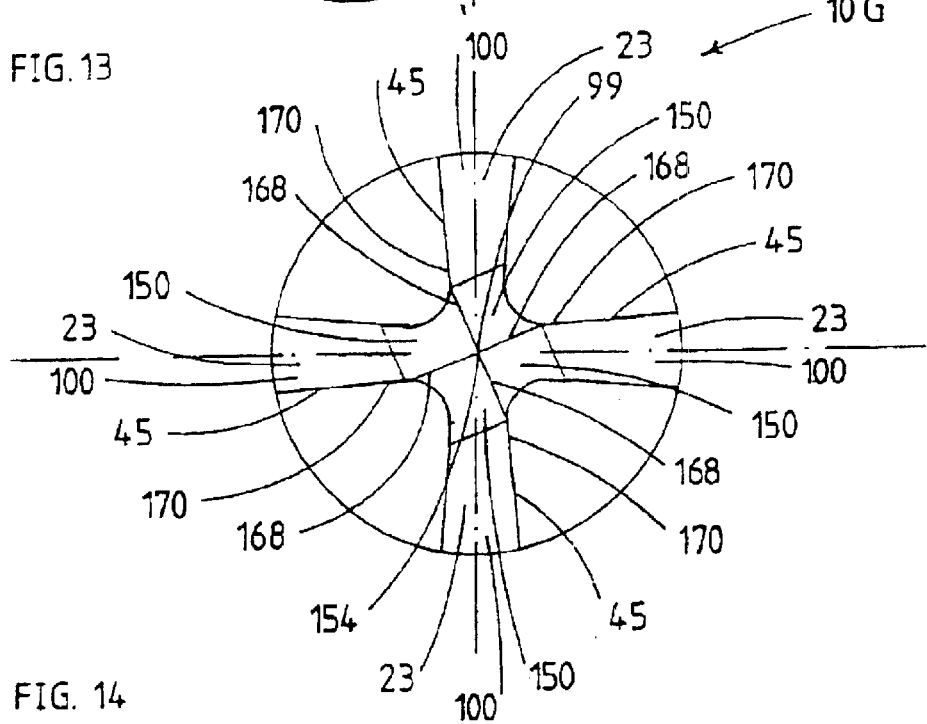
FIG. 14 illustrates a plan view of the bit of FIG. 13.
Figure 15:
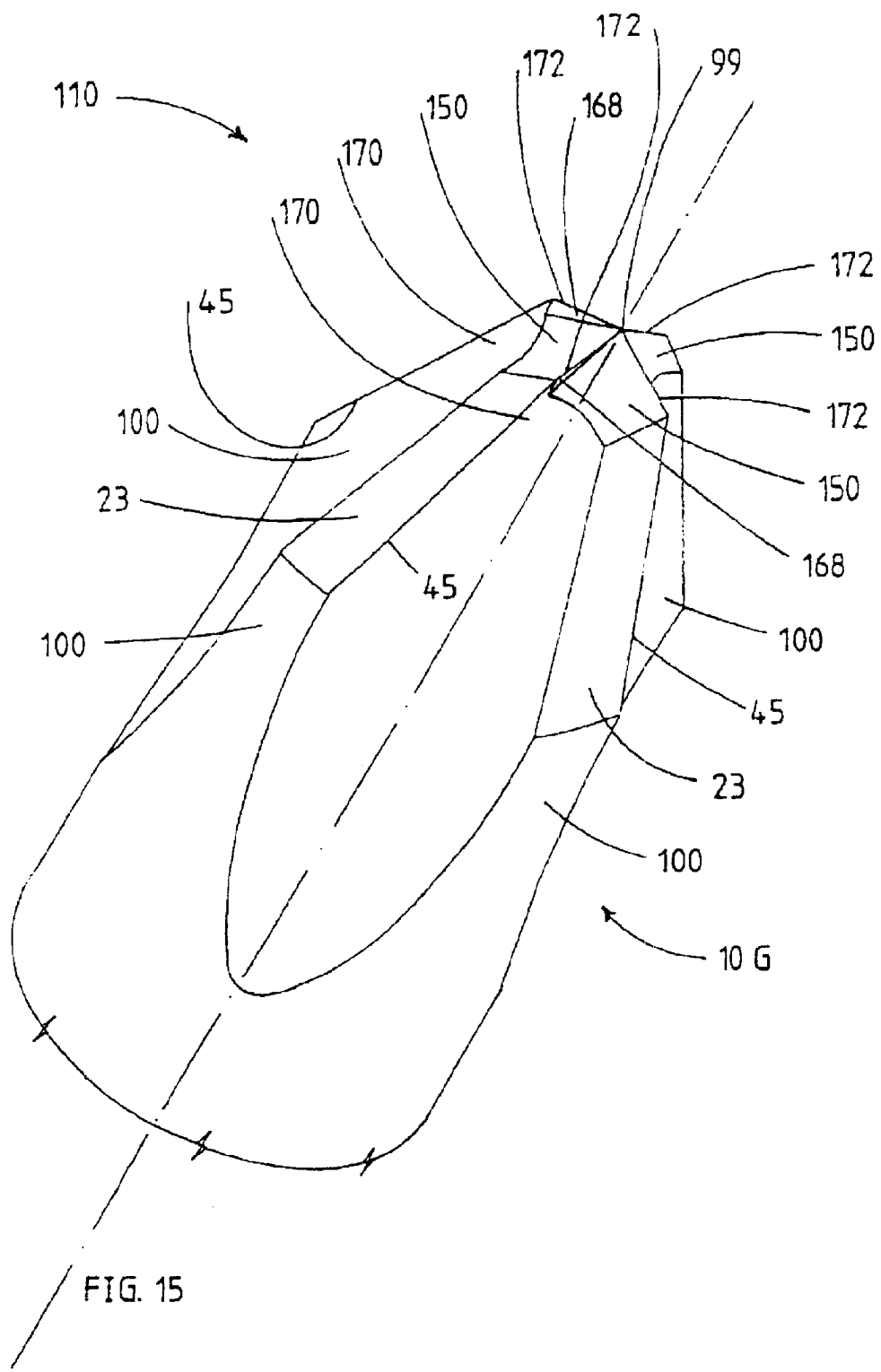
FIG. 15 illustrates a perspective view of the bit of FIG. 13.

Illustrated in FIGS. 13 to 15 is another bit 10G having four blades 100 as in previous embodiments. The four blades 100 are in the Phillip's head configuration where opposed blades are in line and all blades are radially equi-spaced relative to each other.

The blades 100 have cutting edges 45 which are similar to those of previous embodiments such as those having cutting edges 104 as in FIGS. 11 and 12, which run along the leading side edges of the blades. The edges 45 extend along the blades 100 from the shank end to the tip 110. The edges 45 are formed in the same manner as previous embodiments. That is the lateral faces 23 on the blades 100 at an angle of less than 90° and preferably approximately 85° to the side face 170.

The difference between the bit 10G and previous embodiments is that the tip 10 is constructed differently. Each blade 100 includes at its extremity a bevel 150 which is inclined at an acute angle 152 to the rotational axis 154 of the bit 10G. The angle 152 is approximately 60° however an angle in the range of 45° to 85° could be used depending upon the hardness of the timber or other material with which the bit 10G will be used to form a countersunk depression.

As can be seen from FIG. 14 the bevel 150 is formed so that the orientation in plan view as in FIG. 14 is somewhat skewed relative to the radial direction of the blade 100. The skewing is produced by the method of manufacture. In addition to this the bevels 150 are formed so that the tip or apex 99, which is effectively a point, is common to each of the planes which form the bevels 150, that is the bevels 150, or the planes which form them, all pass through the same point or apex 99.

In the formation of the bevel 150, as illustrated in FIG. 17, the angle 152 approximates the tangent to the grinding wheel 160 where the grinding wheel 160 engages the blade 100. The shape of the bevel 150 is represented in the figures as being a planar surface but as can be seen from FIG. 17 the bevel 150 will be curved with the same radius of curvature as the grinding wheel 160 unless the grinding wheel 160 is moved along this tangent. But to all intents and purposes this curvature is difficult to observe in a finished product due to the relative thinness of the blade 100 to which the bevel 150 is applied.

Due to the angle 162 between the axis of rotation 164 of the grinding wheel 160 and the radial direction axis 166 of the blade 100, the grinding wheel 160 will remove material from or grind into the adjacent blade 100 which in this instance is the blade oriented 90° in a clockwise direction from the blade 100 receiving the bevel 150 in FIG. 18. The angle 162 is the complement of the angle of the angle 152, that is the angle 152 and 162 added together equal 90°.

When the bevel 150 is applied to each of the blades 100 there is formed a triangular surface 168 on an adjacent blade which intersects with the bevel 150 on the blade which receives the bevel 150. When considering a single blade 100, a cutting edge 172 is formed by the intersection of the surface 168 and the bevel 150. Further, the surface 168 together with the side surface 170 (which equates to the side surface 21 of previous embodiment) of blade 100 with which it intersects forms a wedge like projection which can be better viewed in FIG. 14.

It is preferred that when the axis of rotation 164 of the bit 10G is oriented in a vertical direction the surface 168 is formed with its direction, as defined by a line perpendicular to the surface 168 being, perpendicular to a parallel vertical axis. The surface 168 is produced with this orientation by the grinding wheel 160 as illustrated in FIG. 17 having its axis of rotation 164 in the horizontal plane when engaging a bit 10G in a vertical orientation.

While this orientation is preferred, if desired the surface 168 can be an undercut surface (that is the surface 168 and bevel 150 on the same blade form an acute angle) or an overcut surface (that is the surface 168 and bevel 150 on the same blade form an obtuse angle) by angling the axis of rotation 164 of the grinding wheel 160 to the horizontal axis in one direction to produce an under cut or in the other direction to produce an overcut. It is believed that the undercut surface will be more useful than an overcut surface, but in some circumstances the overcut may be preferred.

The surface 168 together with a bevel 150 on a single blade 100 forms a cutting edge 170. The cutting edge 172 is the first portion of the bit 10G to engage the material which is to receive the countersunk hole. The wedge shaped projection formed between the surface 168 and 170 also assists in cutting the material and assists in reducing the amount of power required to countersink a hole.

Figure 16:
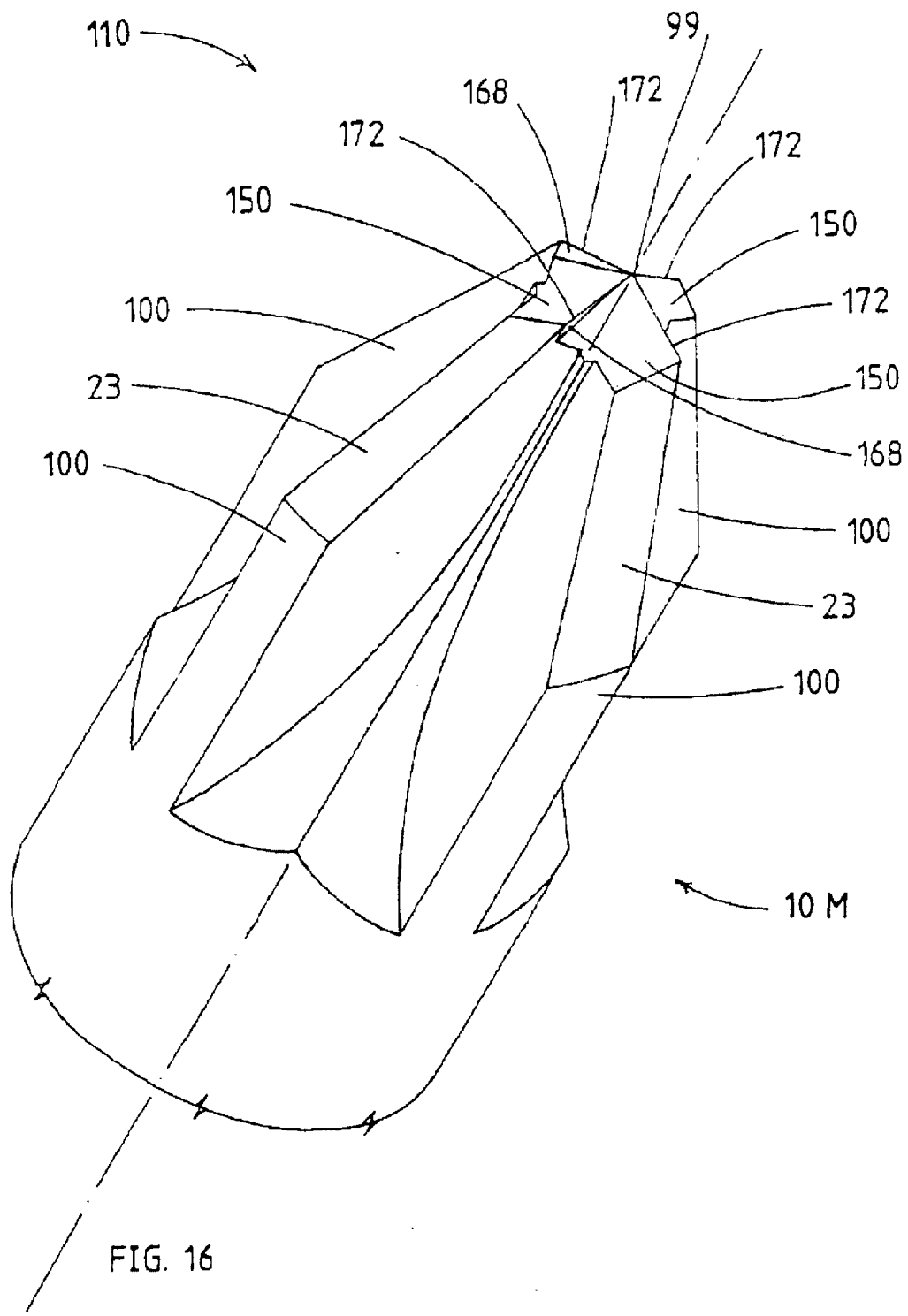
FIG. 16 illustrates a perspective view of a Pozi-Drive bit similar to FIG. 15.

Illustrated in FIG. 16 is a bit 10H of a Posi-drive configuration (which includes a rib 101 between each of the blades 100) which is similar to the bit of FIGS. 13 to 15, and like features have been like numbered. The bit 10H is formed in the same manner as the bit of FIGS. 13 to 15 and will function in the same manner.

As described above it is preferred that the grinding wheel 160 will form a bevel 150 by approaching and or engaging the blade 100 of the bit at an angle other than 90°. This will form the surface 168 and in combination with the surface 170 forms the wedge shaped cutting formation.

Figure 19:
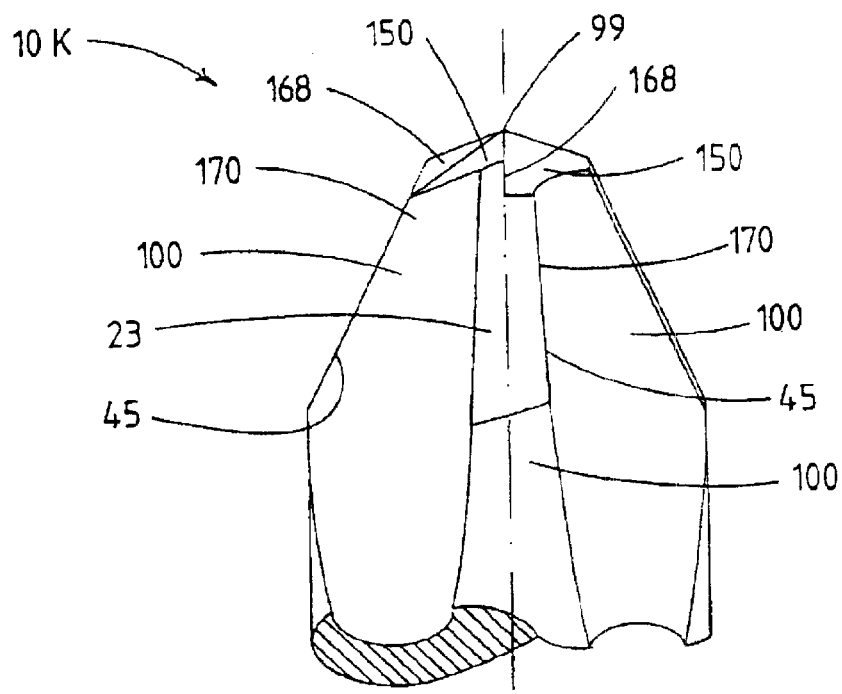
FIGS. 19 and 20 illustrate a front elevation and plan view of another Phillips head bit.
Figure 20:
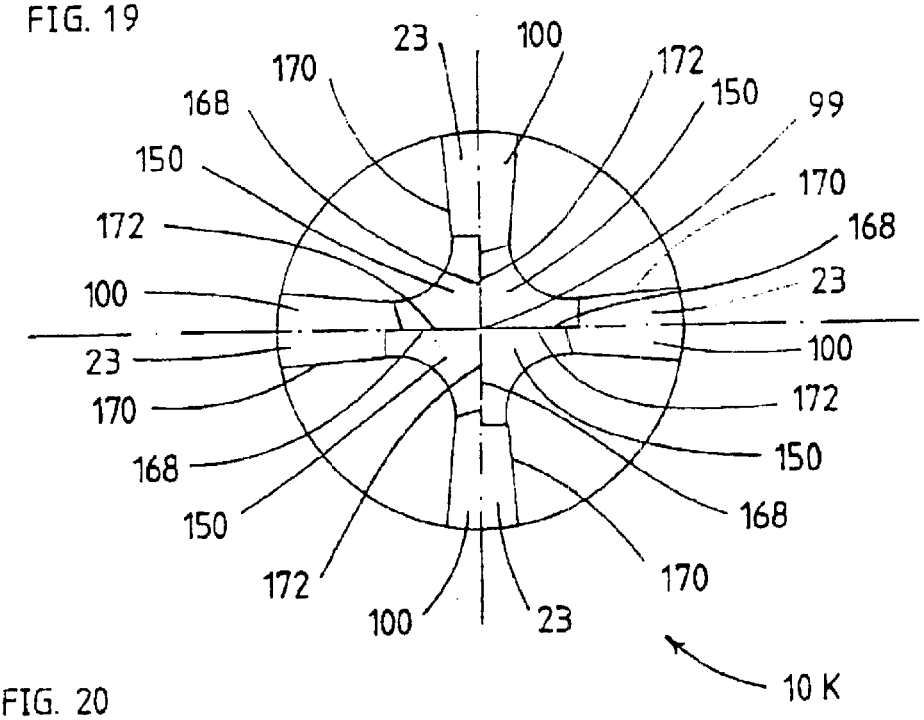
Figure 21:
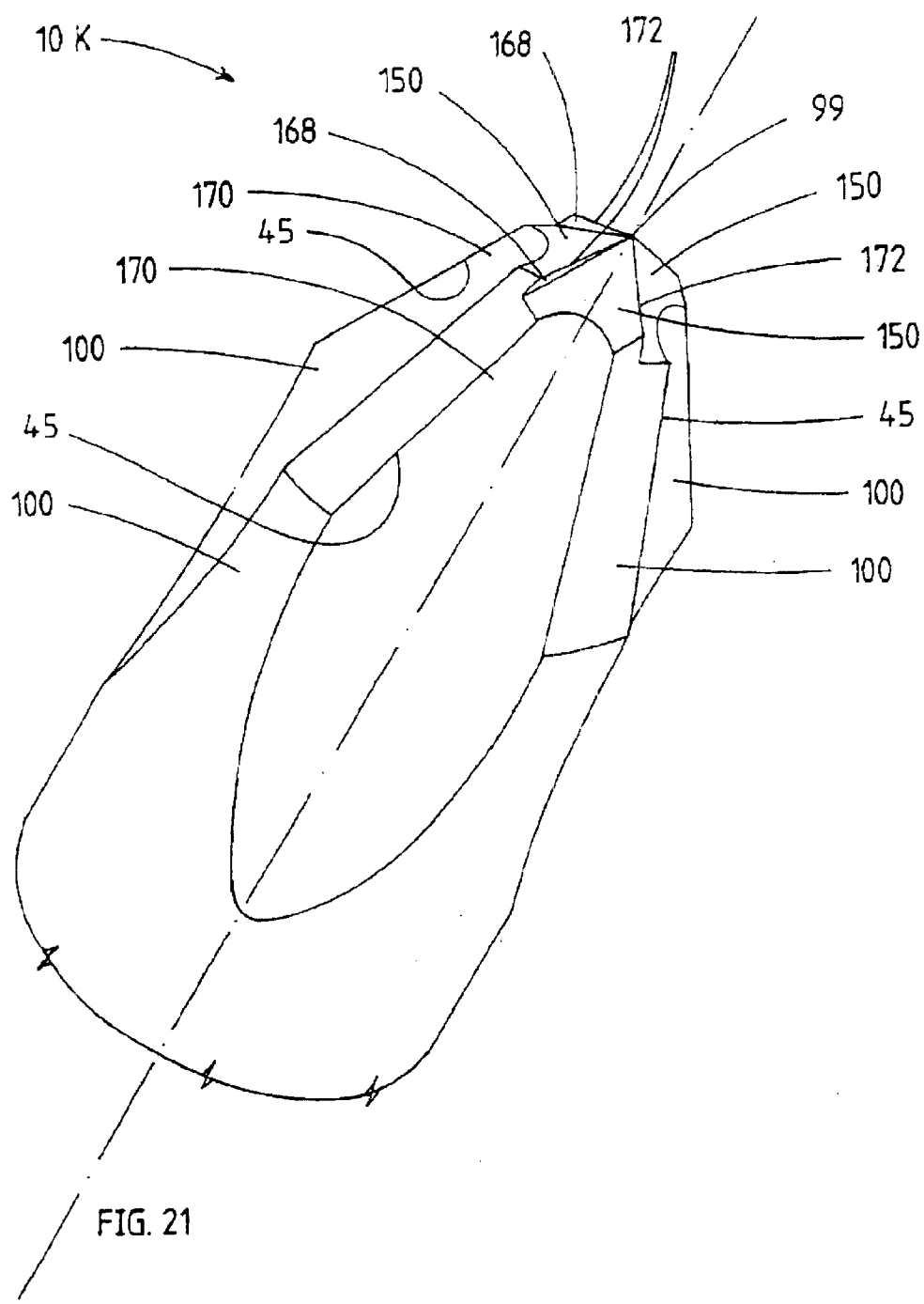
FIG. 21 illustrates a perspective view of the bit of FIGS. 19 and 20.

If desired however, as illustrated in FIGS. 19 to 21 the grinding wheel 160 can be made to approach and or engage the blade 100 at 90° which will be in alignment with or the same direction as an adjacent blade positioned at 90° therefrom. By approaching in this direction the grinding wheel or cutter will also grind or cut through the adjacent blade positioned at 90° therefrom as is illustrated in the bit 10K of FIGS. 19 to 21. This will result in the presence of surface 168 of greater surface area than the previous embodiment with the surface 170 being the remaining side of the adjacent blade no longer intersecting the surface 168 to form a wedge shaped formation. Whilst this bit 10K is expected to be effective in countersinking and screw driving functions it is expected that the embodiments illustrated in FIGS. 13 to 16 will be more efficient, that is requiring lesser power to achieve a countersunk depression or hole to be plugged, due to the presence of the wedge shaped formation formed by the intersection of surfaces 168 and 170 in the embodiments of FIGS. 13 to 16.

The angle 152 between the plane of the bevel 150 and the rotational axis 154 of the bits FIGS. 13 to 21 can be increased or decreased depending upon two man factors. Both factors are dependent upon the material which is to be countersunk and receive a screw. The first factor is the that the angle 152 can be decreased thereby lengthening the length of the bevel 150 in the radial direction. This can be beneficial in some circumstances to assist in the countersinking process, however such an arrangement may not provide sufficient bearing surface to drive a screw. A balance between the amount bearing surface and the angle required on the bevel 150 for countersinking can be identified, so as to provide an optimum arrangement for various timber and other type of material properties.

There may be many variations to described embodiments without departing from the scope of the invention. However, it is envisaged that an arrangement in which the reaming or counter-sinking head is replaceable on the drill shaft, with the drill shaft providing an arrangement for starting a drill hole can have significant advantages in many industries. In particular, the arrangement in which the drill shaft has a screw driver head formed thereon, preferably a Phillips or other similar shape head, adds to the versatility of the tool and allows for both the drilling operation and the screw inserting operation to be carried out using the same drilling tool and the same drill bit. This should significantly decrease the time required to do both drilling and screwing, particularly where the screw head is to be counter sunk.

Furthers the above description discusses the formation of surface 168 and whether it is undercut or overcut being produced by the angle formed between the rotation axis of the cutting/grinding wheel and the rotation axis of the bit. If desired, a grinding/cutting wheel can be used which has grinding and or cutting surfaces at acute angles to form undercuts or obtuse angles to form undercuts, in which case the rotation axis of the grinding/cutting wheel can be kept in the horizontal plane relative to the axis of rotation of the bit.

While the above bits of FIGS. 7 to 21 can be used with a reamer head as described in relation to FIGS. 1 to 6, they can function as a countersinker and screw driver without such a reaming head.

While the bevels 150 described above in respect of FIGS. 13 to 21 are substantially planar in nature, these could be replaced by bevels which are formed from twisted surfaces or part twisted surfaces, such a helical surfaces. With such a twisted surface the embodiment of FIGS. 11, 12 and 22 for example, would not require a central square pyramid at the tip because it could be replaced by a surface which starts in approximately the same plane close to the tip 99 and then shortly thereafter begins to twist, thereby removing the step between the pyramid and the bevel. Such twisted surfaces however, are likely to render the manufacturing more costly in view of the complex machinery required to rotate the axis of the grinding/cutting wheel, or the bit blank, or both, during the cutting/grinding operation to achieve the desired twist.

It will be understood that the invention disclosed and defined herein extends to all alternative combinations of two or more of the individual features mentioned or evident from the text or drawings. All of these different combinations constitute various alternative aspects of the invention.

What is claimed is:

1. A bit for use with a rotatable tool, said bit including:
   a shaft having a rearward end adapted to be held by a chuck of the rotatable tool, and a forward end having cutting tips formed thereon;
   a reaming head including a body having a bore adapted to receive the shaft therethrough in a sliding fit, the body having a plurality of cutting blades formed on at least one peripheral surface thereof;

the bore and/or the shaft having formations thereon such that when the reaming head has the shaft operatively located in the bore the reaming head is rotationally locked to the shaft such that alignment is provided between said cutting blades and said cutting tips;

the reaming head and the shaft being separable from each other to allow either component to be replaced independently of the other;

the shaft having a shoulder thereon against which the reaming head can bear in use.

2. A bit as claimed in claim 1, wherein said forward end of the shaft includes four blades orthogonally aligned or angularly equi-spaced, relative to each other such that said forward end is specifically adapted to be used as a Phillips head or Pozi-drive screw driver, or similar type screw drivers.

3. A bit as claimed in claim 1, wherein said reaming head has a forward face of generally tapered or cone shaped configuration, tapering convergently towards the bore through the body, said forward face having cutting blades formed thereon.

4. A bit as claimed in claim 1, wherein said shaft has a square, hexagonal, or other polygonal cross sectional shape with the bore being of corresponding shape, at least in part, to provide for rotational lock.

5. A bit as claimed in claim 1, wherein said shaft includes a taper along its length with the bore having a corresponding taper to provide for the reaming head to be taper locked to the shaft.

6. A bit as claimed in claim 1, wherein there is further included a spacer located on the shaft rearward of the reaming head to space the reaming head away from the chuck in use.

7. A bit having a tip end and shank end for use with a rotatable tool, said bit having at least four blades to engage and drive a screw when said rotatable tool is rotated, each blade including at said tip end a bevel so as to form a cutter at the extremity of said blade, said bit further including a triangular cutting face adjacent each bevel and/or cutter forming a cutting edge between said face and said bevel and being able to cut in the same rotational direction.

8. A bit as claimed in claim 7, wherein said bevel is formed so as to be confined to each blade.

9. A bit as claimed in claim 7, wherein said bevel is formed so that while being applied to one blade, the bevel is also formed on an adjacent blade.

10. A bit as claimed in claim 7, wherein said cutter includes in its lead portion a wedge shaped formation.

11. A bit as claimed in claim 10 wherein said wedge shaped position is formed on one side by a side of said blade and on another side by the cut of the bevel formed on an adjacent blade.

12. A method of making a bit for use as a screw driver and countersinker, said method including the steps of:

1. forming at least a four blade screw driving end onto one end of blank 2. forming a bevel at the extremity of each blade, said bevel producing an inclined plane cutter and a triangular cutting face adjacent said inclined plane cutter.

13. A method as claimed in claim 12, wherein Step 2 is performed simultaneously on two or more blades, or is performed on one blade at a time.

14. A method as claimed in claim 12, wherein said bevel is formed so as to be present only on each blade extremity.

15. A method as claimed in claim 12, wherein said step of forming a bevel, when performed on a first blade cuts into a second blade, thereby forming a surface adjacent to and dressing the inclined plane cutter of said second blade.

16. A method as claimed in claim 15, where an under cut is formed by said bevel cutting into said second blade.

17. A method as claimed in 15, wherein said cut produces a surface which has its direction normal to the axis of rotation or an axis parallel to the axis of rotation of said bit.

18. A method as claimed in claim 15, wherein said cut and a side of said blade on which said cut is located form, on the lead portion of each blade, a wedge shaped portion.

19. A method as claimed in claim 12, wherein the rest of said blade away from said bevel includes another cutting edge extending from the tip end towards the shank end.

20. A method as claimed in claim 12, wherein said bevel is formed by a grinding wheel.

21. A method as claimed in claim 20, wherein said grinding wheel has its axis of rotation parallel to the axis of said blade when said tip is viewed in plan view.

22. A method as claimed in claim 15, wherein said cut is formed in said second blade by an axis of rotation of a grinding wheel being at an acute angle to the axis of said blade when viewed in plan view.

23. A method as claimed in claim 12, wherein said bit is indexed 90° for a grinding wheel to form said bevel on each blade.

24. A bit as claimed in claim 7, wherein a cutting edge of said triangular cutting face is rotationally behind a cutting edge of said cutter.

25. A bit as claimed in claim 7, wherein a cutting edge of said triangular cutting face coincides with a cutting edge of said cutter.

26. A bit as claimed in claim 7, wherein said bevel extends to an axial extremity of some blades of said bit.

27. A bit as claimed in claim 7, wherein said bevel extends to a radial extremity of said bit.

28. A method as claimed in claim 12, wherein a cutting edge of said triangular cutting face is rotationally behind a cutting edge of said cutter.

29. A method as claimed in claim 12, wherein a cutting edge of said triangular cutting face coincides with a cutting edge of said cutter.

30. A method as claimed in claim 12, wherein said bevel extends to an axial extremity of some blades of said bit.

31. A method as claimed in claim 12, wherein said bevel extends to a radial extremity of said bit.

* * * * *